United States Patent [19]

Takakuwa et al.

[11] Patent Number: 4,516,311
[45] Date of Patent: May 14, 1985

[54] MACHINING CENTERS

[75] Inventors: Shilo Takakuwa; Isao Kobayashi, both of Ueda; Tastuo Takahashi, Komoro; Shige Imamizu, Ueda, all of Japan

[73] Assignee: Kabushiki Kaisha Miyano Tekkosho, Nagano, Japan

[21] Appl. No.: 454,666

[22] Filed: Dec. 30, 1982

[30] Foreign Application Priority Data

Apr. 21, 1982 [JP] Japan ................................ 57-66889

[51] Int. Cl.³ .......................................... B23Q 3/157
[52] U.S. Cl. ...................................... 29/568; 29/26 A
[58] Field of Search .................. 29/26 A, 568; 408/35

[56] References Cited

U.S. PATENT DOCUMENTS

| 2,430,843 | 11/1947 | Colwell | 409/231 |
| 4,426,763 | 1/1984 | Hornok et al. | 29/568 |
| 4,443,928 | 4/1984 | Kielma | 29/568 |

FOREIGN PATENT DOCUMENTS

| 32890 | 7/1981 | European Pat. Off. | 29/568 |
| 3017613 | 11/1981 | Fed. Rep. of Germany | 29/568 |
| 144944 | 11/1980 | Japan | 29/568 |
| 54044 | 3/1982 | Japan | 29/568 |
| 1486524 | 9/1977 | United Kingdom | 408/35 |
| 774918 | 10/1980 | U.S.S.R. | 29/568 |

*Primary Examiner*—Gil Weidenfeld
*Assistant Examiner*—Daniel W. Howell
*Attorney, Agent, or Firm*—Ladas & Parry

[57] ABSTRACT

A machining center comprises a horizontal bed, a column disposed perpendicularly to the bed, a plurality of slide rest located to be relatively movable to the bed and column, a spindle head, and a tool magazine. The spindle head includes vertical and horizontal spindles and a tool exchanging mechanism comprising tool exchanging arm assemblies positioned at positions suitable for the corresponding spindles and adapted to exchange tools held by the tool magazine with those held by the vertical and horizontal spindles.

2 Claims, 5 Drawing Figures

MACHINING CENTERS

BACKGROUND OF THE INVENTION

This invention relates to a machining center for working relatively small workpieces each having a box shape, and more particularly, a machining center which is provided with a spindle head having vertical and horizontal spindles for working upper and side surfaces of a workpiece and in which tools are exchanged between the vertical and horizontal spindles and a tool magazine.

Most of conventional machining centers adapted to work the upper and side surfaces of workpieces are of a double column type and generally intended to work relatively large workpieces, whereas the upper and side surfaces of relatively small workpieces are worked by rotating a spindle head provided with one spindle. However, the working method of rotating the spindle head accompanies unstable restoring characteristic and lacks in rigidity, and thus, a time loss is involved for the working operation of a large workpiece to exchange tools and for a small workpiece, it is required to change the direction of the spindle head every time when tools are to be exchanged.

SUMMARY OF THE INVENTION

An object of this invention is to obviate defects encountered in the prior art and to provide a machining center provided with a spindle head having vertical and horizontal spindles which are independently driven, and tools used or to be used are exchanged between the vertical and horizontal spindles and a commonly used tool magazine.

According to this invention there is provided a machining center of the type comprising a horizontal bed, a column disposed perpendicularly to the bed, first, second, and third slide rests located to be relatively movable with respect to the bed and column, a spindle head equipped with the column and including spindles for holding tools, a tool exchange mechanism, and a drive mechanism attached to the spindle for operating said spindles, a tool magazine secured to the column, and a table on which a workpiece is mounted, and the machining center is characterized in that the spindles comprises vertical and horizontal spindles and the tool exchange mechanism comprises tool exchange arm assemblies positioned for the corresponding vertical and horizontal spindles and adapted to exchange tools held in the tool magazine with those held in the vertical and horizontal spindles.

DESCRIPTION OF THE PREFERRED EMBODIMENT

Figure 1:
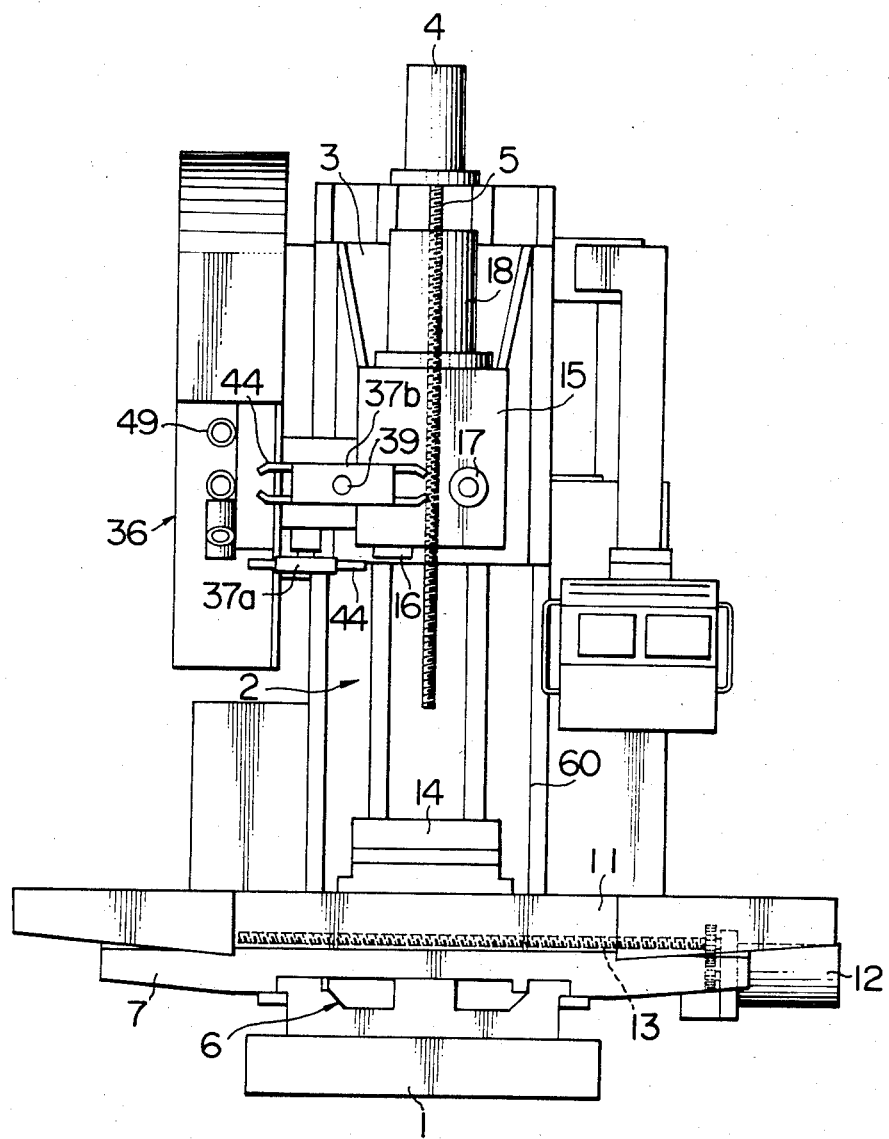
FIG. 1 is a schematic front view of a machining center according to this invention.
Figure 3:
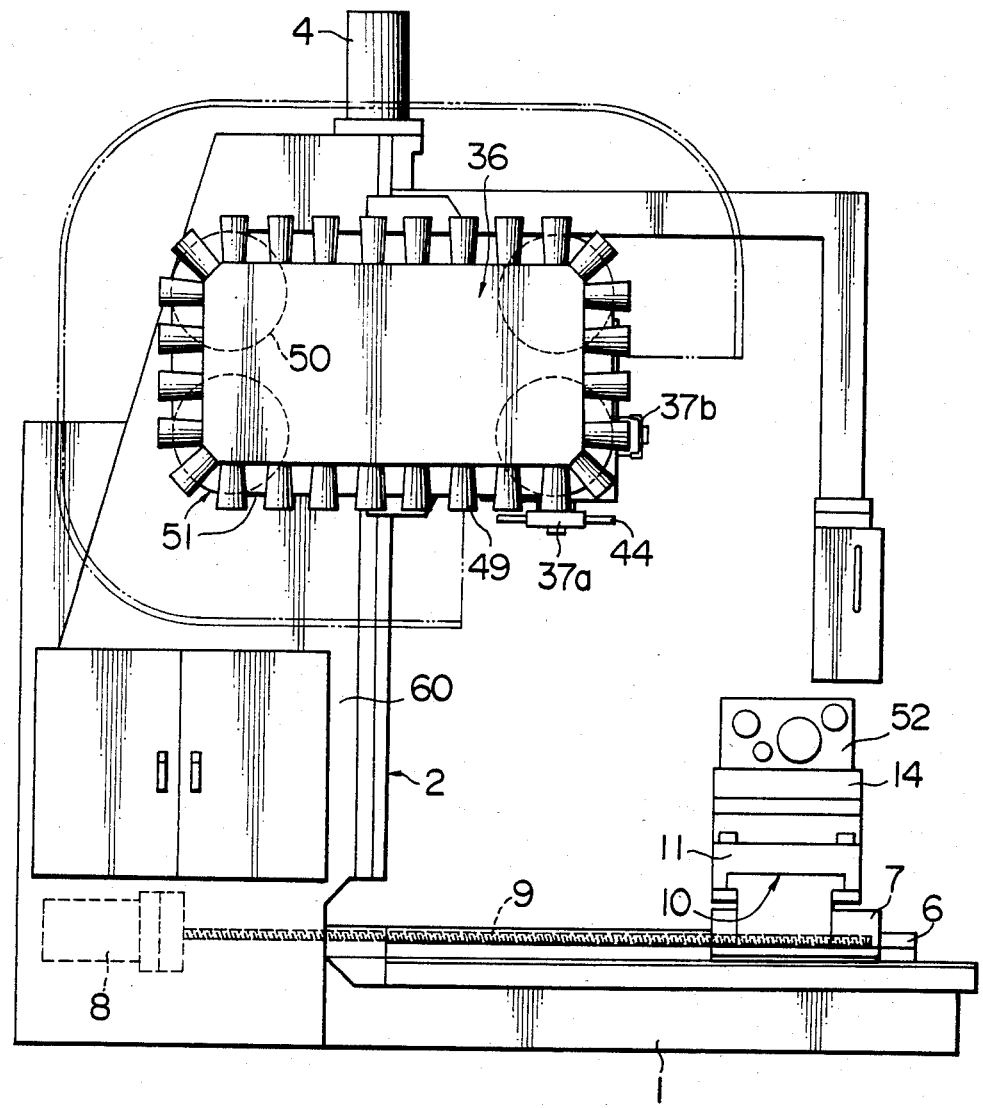
FIG. 3 is a side view of the machining center shown in FIG. 1.

Referring to FIGS. 1 and 3, a machining center generally comprises a horizontal base bed 1, a column 60 disposed perpendicularly to the bed 1, first, second, and third slide rests 3, 7, and 11, a spindle head 15 equipped with the column 60 and including a tool exchanging mechanism 35, a driving mechanism secured to the spindle head 15, a tool magazine 36 attached to the column 60, and a table 14 on which a workpiece is set.

The first slide rest 3 is reciprocatingly attached to the first guide surface 2 of the column 60 by means of a ball screw 5 driven by a servo-motor 4, the first guide surface 2 extending vertically from the horizontal bed 1. The second slide rest 7 is reciprocatingly attached by a ball screw 9 driven by a servo-motor 8 to the second guide surface 6 which extends along the horizontal surface of the bed 1 in a direction normal to the first guide surface 2. The third rest 11 is also reciprocatingly attached to the third guide surface 10 on the second slide rest 7 by means of a ball screw 13 driven by a servo-motor 12 and the third guide surface 10 extends normally to the first guide surface 2 and horizontally to the second guide surface 6.

The table 14 on which a workpiece is set is rotatably secured to the third slide rest 11 and indexing operation of the workpiece on the horizontal surface of the table 14 can be carried out by an electric motor and a cylinder assembly, not shown.

The spindle head 15 is mounted on the first slide rest and provided with a vertical spindle 16 supported in a direction parallel to the first guide surface 2 and a horizontal spindle 17 supported in a direction parallel to the second guide surface 6 as shown in FIG. 1 or 3. The vertical and horizontal spindles 16 and 17 are driven independently at variable high and low speeds by a power transmission mechanism including a motor and speed variable gearings. The power transmission mechanism will be described hereunder in detail in conjunction with FIG. 2.

Figure 2:
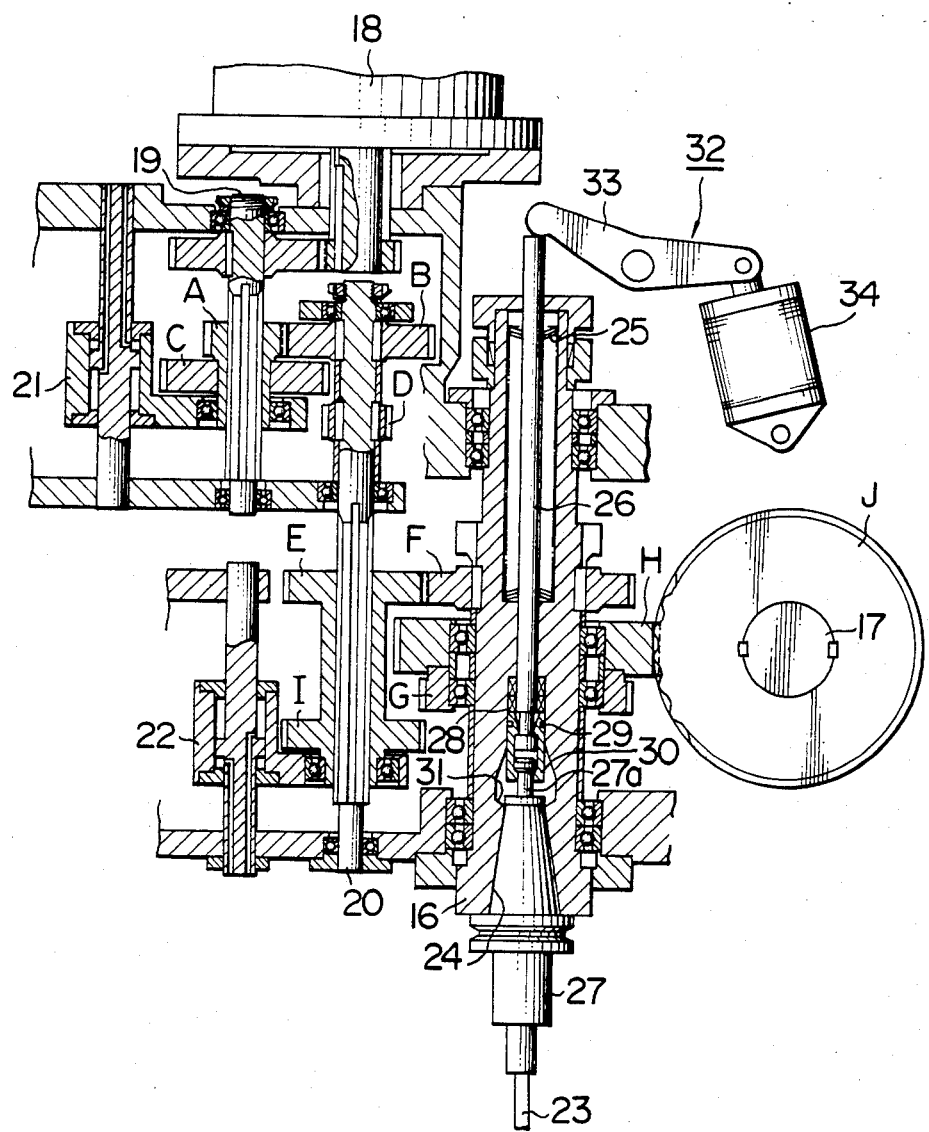
FIG. 2 shows a vertical section showing a power transmission mechanism for driving vertical and horizontal spindles.

Referring to FIG. 2, first and second driving shafts 19 and 20 are rotatably carried by the spindle head 15 in a direction parallel to the axial direction of the vertical spindle 16. Gears A through J are mounted to be axially movable or secured to driving shafts 19 and 20 so as to operatively engage with and disengage from each other when hydraulic or pneumatic cylinder assemblies 21 22 are actuated to transmit driving powers to the gears A through J at a high or low speed.

On the vertical spindle 16 is securely mounted a gear F which is meshed with a gear E to thereby transmit the driving power through the gears A through E. Spiral gears H and G are rotatably mounted on the vertical spindle 16 to transmit rotating power to the horizontal spindle 17 through the engagement of the gear H and a gear J secured to the horizontal spindle 17, whereby the vertical and horizontal spindles 16 and 17 are independently driven in accordance with the actuation of the hydraulic or pneumatic cylinder assembly 22.

Since vertical and horizontal tools 23 (horizontal tool 23 is not shown) are fitted into tool holding holes 24 of the vertical and horizontal spindles 16 and 17 in substantially the same manner, only the attachment of the vertical tool 23 will be described hereunder in conjunction with FIG. 2.

The vertical spindle 16 is provided with a conical hole 24 at the front end (lower end as viewed in FIG. 2)

for detachably holding the tool 23 which is held by a chuck 27, and a vertically movable clamping rod 26 is disposed in the central opening of the vertical spindle 16 so as to extend along its central axis and is moved vertically against the urging force of a counter sunk spring 25. A holding member 28 is attached to the lower end of the clamping rod 26, and the holding member 28 comprises a claw 30 which is opened by the action of a spring 29 attached to the member 28 and closed when the clamping rod 26 is backwardly (upwardly) moved. At this time, the outer surface of the claw 30 engages the inwardly tapered hole 31 communicating with the hole 24 so that the claw 30 clamps a stud 27a of the tool holder 27 and pulls the stud 27a to firmly engage the tool 23 with the hole 24.

A tool releasing mechanism 32 is attached to the spindle head 15 and comprises a lever 33 pivoted on the spindle head and provided with one end contacting with the rear end of the clamping rod 26. The lever 33 is operated by a piston-cylinder assembly 34 and when the lever 33 operated to push downwardly the clamping rod 26, the claw 30 disengages from the stud 27a and the tool 23 is pushed out from the hole 24.

Figure 4:
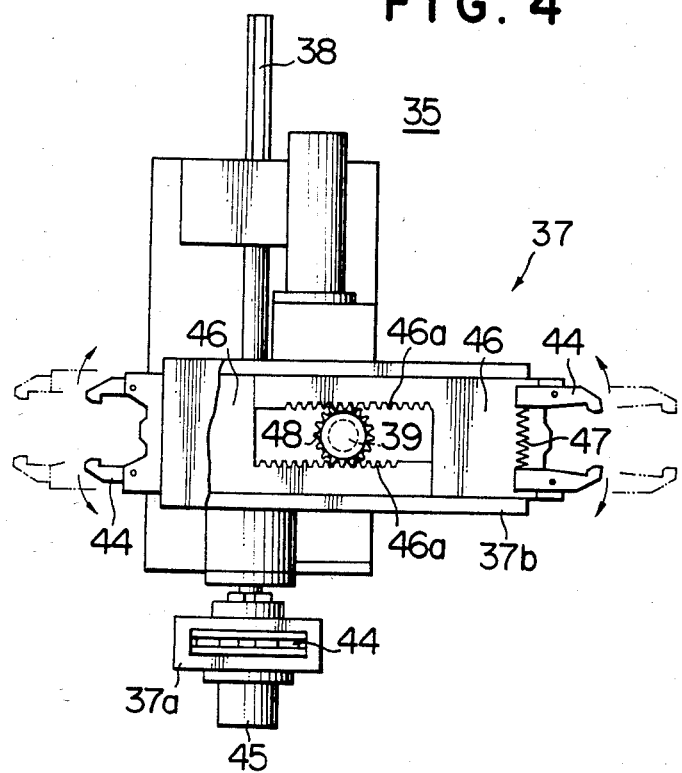
FIG. 4 shows a tool exchanging mechanism, partially in section, according to this invention.

FIG. 4 shows a tool exchanging mechanism 35 which is mounted on the spindle head 15 and comprises arm assemblies 37 including a pair of arms 37a, and a pair of arms 37b located at positions suitable for exchanging tools 23 held by the vertical and horizontal spindles 16 and 17 with ones stored in the tool magazine 36 which is disposed adjacent to the vertical and horizontal spindles on the side of the first guide surface 2 (FIG. 3). One tool exchanging arm assembly 37a for the vertical spindle 16 is mounted on a rotating shaft 38 supported by and extending from the tool exchanging mechanism 35 in a direction parallel to the axial direction of the spindle 16. The tool exchanging arm assembly 37a is mounted to be rotatable about the shaft 38 and reciprocatingly in a direction of the axis of the shaft 38 by means of a key or splines. The other tool exchanging arm assembly 37b for the horizontal spindle 17 is mounted on a rotary shaft 39 supported by and extending from the tool exchanging mechanism 35 in a direction parallel to the axial direction of the horizontal spindle 17 at a position not interfering the rotation and reciprocation of the arm assembly 37a. The arm assembly 37b is mounted to be rotatable about the shaft 39 and reciprocatingly in a direction of the axis of the shaft 39 by means of a key or splines.

Figure 5:
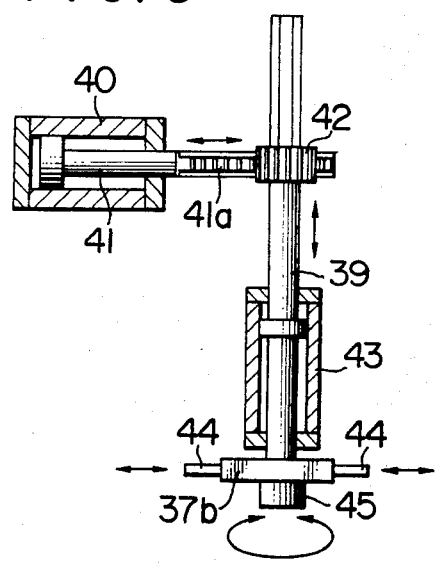
FIG. 5 shows a driving mechanism, partially in section, of an arm assembly of the tool exchanging mechanism shown in FIG. 4.

Although the tool exchanging arm assemblies 37a and 37b have substantially the same constructions and operate in substantially the same manners, only those regarding the arm assembly 37b are described hereunder with reference to FIGS. 4 and 5.

Referring to FIG. 5, the tool exchanging arm assembly 37b is rotated by the engagement of a rack 41a formed on a piston rod 41 of a hydraulic or pneumatic piston-cylinder assembly 40 with a pinion 42 slidably mounted on the rotary shaft 39 and the assembly is reciprocated by the actuation of a piston-cylinder assembly 43 mounted on the shaft 39.

Referring again to FIG. 4, when it is desired to exchange a used tool 23 held by one of arms 37b with a tool stored in a predetermined tool pot 49 of the tool magazine 36, a pair of movable members 46 constituting corresponding arms 37b move respectively towards the tools 23 held by the horizontal spindle 17 and the tool pot 49. Tool holding claw members 44 pivotally mounted on the front ends of the movable members 46 and biased by compression springs 47 also move to positions shown by dotted lines in FIG. 4 to clamp the tool holders 27 when the claw members 44 engage the holders 27. The movable members 46 are reciprocated by the engagement of racks 46 formed on the movable members with a pinion 48 mounted on the driving shaft of a hydraulic or pneumatic motor 45 (FIG. 5). Thus, the claw members 44 hold or release the tool holders 27 by the operation of the compression springs 47.

As shown in FIG. 3, the tool magazine 36 comprises a number of tool pots 49 adapted to receive the tool holders 27 and mounted at an equal spacing on an endless chain 51 passion about sprockets 50. The chain 51 is driven along a track in a plane including vertical and horizontal axes of the vertical and horizontal spindles 16 and 17.

Each tool pot 49 is provided with means for detachably engaging the tool holder 27 and when exchanging tools, the tool holders 27 with the tools 23 of the vertical and horizontal spindles 16 and 17 are exchanged with those received in the corresponding pots 49 through the operations of the tool exchanging arm assemblies 37.

The machining center according to this invention carries out the tool exchanging operation in accordance with the following manner.

When it is desired to work a workpiece 52 mounted on the table 14, a tool suitable for working one side surface of the workpiece generally having a box-like shape is selected and a pot 49 holding the selected tool is moved to a position at which this tool will be exchanged with the tool held on the horizontal spindle 17. The actual tool exchanging operation is carried out by the steps of advancing tool holding claw members 44 of the arms 37b towards the tools 23 held by the spindle 17 and the pot 49 to engage the peripheral surfaces of the tool holders 27 and hold them by the action of the compression springs 47, forwardly moving arms 37b in the axial direction of the rotary shaft 39 to pull out the tool holders 27, rotating the arm assembly 37b by 180° about the rotary shaft 39, operating the piston-cylinder assembly 45 to backwardly move the movable members 46, i.e. the claw members 44 with the tool holders 27, to the original positions, moving backwardly the arm assembly in the axial direction of the shaft 39, advancing the claw members 44 towards the spindle 17 and the empty pot 49, and fitting the tool holders 27 into the spindle 17 and the pot 49.

During the sequence of these steps for exchanging the tools, the clamping rod 26 in the horizontal spindle 17 is moved downwardly against the force of the counter sunk spring 25 by the operation of the releasing mechanism 32 and the holding claw 28 is opened by the action of the spring 29. At the same time as the new tool holder 27 inserted into the spindle hole 24, the clamping rod 26 is retracted so that the claw 28 holds and draws the stud 27a to thereby firmly secure the tool holder 27 to the horizontal spindle 17.

After the tool exchanging operation has finished, the arms 37b are moved backwardly to disengage the holding claw members 44 from the tool holders 27 against the spring force. The arm assembly is then rotated by 180° to the original position and waits there for the next tool exchanging operation. The horizontal spindle 17 is thereafter moved to the predetermined position for working the desired side surface of the workpiece by the relative movements of the first, second, and third slide rests 3, 7, and 11 which are numerically controlled.

When it is desired to work the other side surfaces of the workpiece, desired one of the other side surfaces is indexed on the table 14 to a position suitable for the working operation corresponding to the position of the tool held by the horizontal spindle 17 and the spindle 17 is rotated at a speed suitable for the working condition of the desired surface.

On the other hand, when it is required to work the upper surface of the workpiece, the tool 23 held by the vertical spindle 16 is positioned at a predetermined position suitable for the working operation of the upper surface through the movement of the tool exchanging arm assembly 37a which is positioned and moved to a position not interfering the operation of the arms 37b and the tool magazine 36. The tool exchanging operations between the vertical spindle 16 and the tool pot 49 of the magazine are carried out by substantially the same manner as those described in connection with the horizontal spindle 17 and will be understood by reading the terms "vertical spindle 16", "arm 37a" and "shaft 38" in place of the terms "horizontal spindle 17", "arm 37b", and "shaft 39", respectively.

As described hereinbefore, according to this invention, the upper and side surfaces of relatively small workpieces can be worked by the tools held by the vertical and horizontal spindles which are independently driven, and tool exchanging operations can promptly be carried out without significant time loss for the working of the workpieces.

We claim:

1. In a machine center of the type comprising a horizontal bed, a column disposed perpendicularly to said bed, first, second and third slide rests located to be relatively movable with respect to said bed and column, a spindle head mounted on said first slide rest to be movable vertically relative to said column, vertical and horizontal spindles provided in said spindle head for holding cutting tools, respectively, a tool exchanging mechanism and a drive mechanism attached to said spindle head for operating said spindles, a tool magazine secured to said column, and a table on which a workpiece is mounted, the improvement in which said tool magazine comprises an endless roller chain extended in a vertical plane so as to form a horizontal path and a vertical path, a number of tool pots being provided along the roller chain, said tool exchanging mechanism comprises a pair of tool exchanging arm assemblies provided respectively for said vertical and horizontal spindles so as to exchange tools held by said spindles with those stored in said tool magazine, each of said tool exchanging arm assemblies comprising a first hydraulic driving means for rotating a shaft, a second hydraulic driving means for reciprocating said shaft in its longitudinal direction, a frame member secured to an end of said shaft, a pair of arms slidably supported in an opposing parallel relationship by said frame, each of said arms having tool holding claw members pivotally mounted on an outer end thereof and a rack portion provided along an inward surface opposing the other arm, a pinion engaging with said rack portions of said arms, and a third driving means which rotates said pinion for reciprocating said two arms in opposite directions in said frame so that the tool holding claw members at the ends thereof are reciprocated between a first positional state in which cutting tools held in the spindle and stored in the magazine can be seized by the tool holding claw members, and a second positional state in which the claw members retract from the cutting tools.

2. The machining center according to claim 1 wherein said driving mechanism of said spindle head includes a power transmission mechanism for driving said vertical and horizontal spindles, said power transmission mechanism comprising a driving means, a rotary shaft connected to said driving means, speed variable gearings provided between said shaft and another shaft, first and second gears spline connected to said another shaft, third gear secured to said vertical spindle and fourth gear secured to said horizontal spindle, and a hydraulic device operable between a first position wherein said first gear spline connected to said another shaft is brought into engagement with said third gear secured to said vertical spindle and a second position wherein said second gear spline connected to said another shaft is brought into engagement with said fourth gear secured to said horizontal spindle.

* * * * *